No. 695,281. Patented Mar. 11, 1902.
G. K. CUMMINGS.
MACHINE FOR MAKING PRISMATIC GLASS.
(Application filed May 18, 1898.)
(No Model.)

WITNESSES:

INVENTOR
George K. Cummings
BY
Witter & Kenyon
ATTORNEYS

THE NORRIS PETERS CO., PHOTO-LITHO., WASHINGTON, D. C.

UNITED STATES PATENT OFFICE.

GEORGE K. CUMMINGS, OF NEW YORK, N. Y.

MACHINE FOR MAKING PRISMATIC GLASS.

SPECIFICATION forming part of Letters Patent No. 695,281, dated March 11, 1902.

Application filed May 18, 1898. Serial No. 681,010. (No model.)

*To all whom it may concern:*

Be it known that I, GEORGE K. CUMMINGS, a citizen of the United States, residing in the city of New York, county and State of New York, have invented a new and useful Machine for Making Prismatic Glass, of which the following is a full, clear, and exact specification, reference being had to the accompanying drawings, which form a part hereof.

My invention relates to a machine for rolling sheets of prismatic glass provided with ribs of angular or prismatic form, from which panes of prismatic glass or what are known as "prism-lights" of any desired shape can be cut; and the object of the invention is to provide a machine by means of which such sheets of prismatic glass can be easily and accurately and economically made, which machine shall be simple in construction and easy to operate.

Heretofore it has been the general practice to make panes of prismatic glass or prism-lights by a molding process. In this process a mold had to be prepared having the exact form and outline and size of the prism-light to be produced and glass had to be compressed in this mold by suitable means and then removed therefrom. No other practicable means or device has been known or used in the art for the manufacture of such prism-lights.

My improved machine is provided with a revolving plain roller, a supporting device to hold the glass against the roller, provided with parallel ribs of a prismatic form corresponding to the depressions to be made in the glass, the said roller and supporting device having a traversing motion relatively to each other.

My machine is fully shown in the accompanying drawings, in which—

Figure 1:
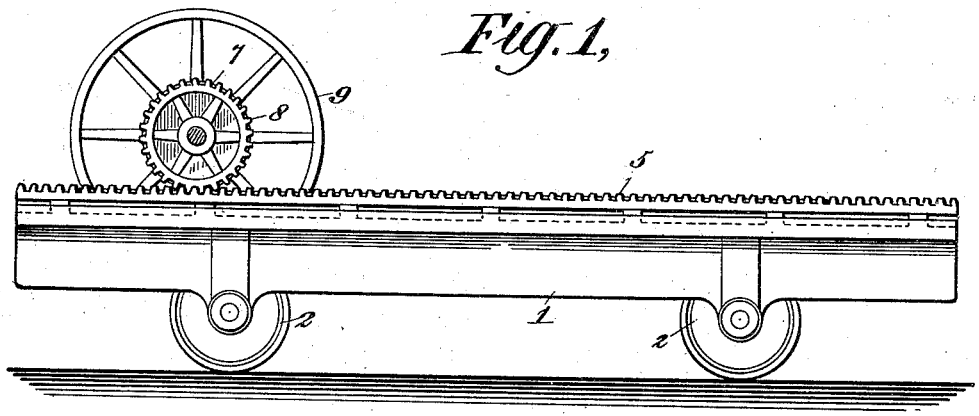
Figure 2:
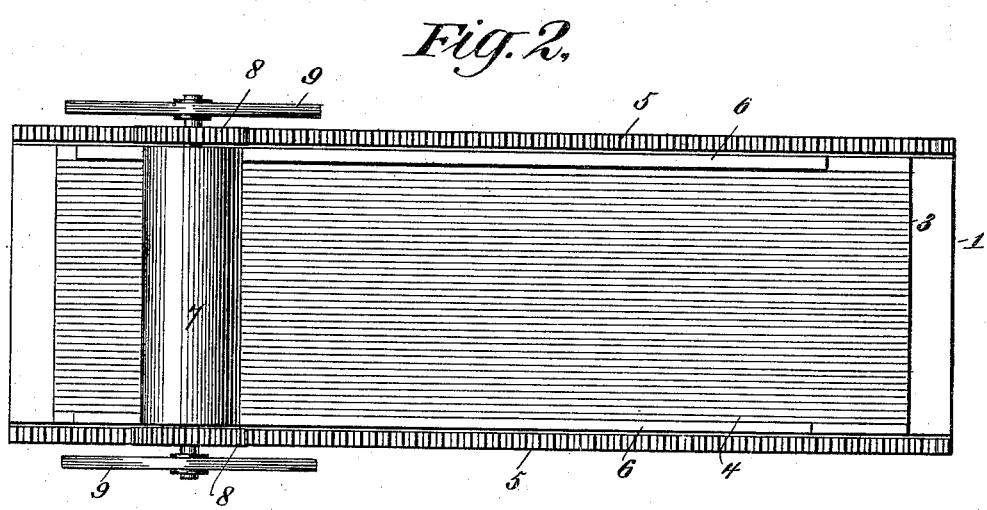
Figure 3:
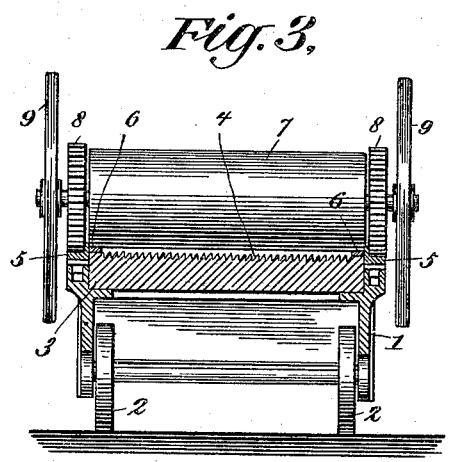

Figure 1 is a side view thereof; Fig. 2, a plan view, and Fig. 3 a cross-sectional view thereof.

Similar numbers refer to similar parts in the different figures.

Referring now to the preferred form of my invention shown in the drawings, 1 is a suitable framework, which I prefer to mount upon wheels 2, so that the machine can be conveniently moved from place to place. This framework carries the table 3, upon which the molten glass is poured in the operation of the machine and which serves, among other things, to support the glass against the roller during the rolling operation. This table is provided with a series of parallel ribs of a prismatic form corresponding to the depressions to be made in the glass. In the form of ribs shown herein in the drawings the ribs are parallel continuous ribs 4, triangular in cross-section and having a cutting edge at their outer angle. These ribs are parallel with one another and are also parallel with the direction of motion of the movable part of the machine, whether that be the roller or the table itself. The ribs 4 are preferably made to extend the entire length of the table 3.

5 5 are racks which are fastened in any suitable manner to the sides of the table or the frame. The racks 5 5 are made vertically adjustable by any suitable device, so that the roller can be lifted to any suitable distance above the table and the thickness of the plate of glass thereby regulated.

6 6 are strips which are placed along the sides of the table 3 and upon which the roller rides, the thickness of these strips determining the thickness of the completed plate. These strips also serve to determine the width of the plate and to form the sides thereof, as clearly indicated in Fig. 3.

7 is a roller which is provided with a plain or smooth surface. This roller is adapted to ride on the strips 6 6. The roller is provided at its ends with the gear-wheels 8 8, which are adapted to mesh with the racks 5.

9 9 are hand-wheels attached to the roller, by means of which the roller can be revolved and moved from one end of the table to the other. The cutting edges of the triangular ribs 4 of the table extend in a direction toward the roller 7.

The operation of the machine is as follows: The roller and table are first heated by any suitable means, so as to be brought to the proper temperature for operating upon the glass. This can be done by simply pouring a certain amount of molten glass upon the roller and table until they are properly heated. If the roller and table are used in a cold state, they will be found to chill the glass, and thereby to injure the product. The roller having been moved to one end of the table, the molten glass is poured on the table in front of the roller, a sufficient quantity being supplied to the table to make a full sheet of prismatic glass. The surface of the glass which comes into contact with the ladle and also with the air and with the table is chilled to some extent. In order to make the mass of glass as nearly homogeneous in temperature as possible, the glass is first stirred on the table by any suitable form of stirrer. By means of the hand-wheels 9 the roller is then rolled along the table, so as to roll the mass into the form of a sheet of prismatic glass. The prismatic ribs on the table form a series of parallel triangular grooves. These grooves act as channels or troughs. The natural tendency of the glass is to flow down or along these troughs. As the roller moves over the table and bears down upon the glass a sufficient quantity of the glass passes underneath the roller to fill up all the space between the table and the roller, filling up the grooves or troughs between the ribs on the table and forming complete and perfect and clean-cut prismatic projections on the under surface of the glass. The rest of the glass mass is easily forced by the roller along the troughs. The sharp edges of the ribs on the table easily penetrate or divide the lower layer of the glass, and the glass readily flows to the bottom of each trough and fills the trough full, making a perfect prismatic rib on the glass plate complete in form and outline and with clean-cut edges and without imperfections. The glass does not encounter any square surfaces or shoulders which tend to break or tear the glass irregularly and to chill it more at one point than at another. Moreover, the glass being forced along the straight surfaces of the troughs and being cut or separated by the sharp knife-edges of the ribs does not tend to entrap the air, which would result in the formation of air-bubbles. The finished plate is free from such air-bubbles. The ribs or projections on the table being continuous and parallel with the direction of motion of the roller also act as wedges or guides projecting up into the glass and tending to make the glass flow uniformly along the table, so as to distribute itself equally over the surface thereof and preventing it from bunching up at any one part of the same. When the glass has been rolled into a plate, as described, it is of the utmost importance to remove it at once from the table and to convey it as quickly as possible to the annealing-oven. If allowed to grow cool, it will break easily and cannot be cut afterward. When it has been rolled, the plate of glass cannot be lifted up from the plate, but must necessarily be drawn or slid along its surface onto the wagon or other device that is to convey it to the annealing-oven. In my machine, as each prism which is formed on the under side of the glass meshes with and just fits the corresponding trough or groove in the table and as these troughs or grooves are of uniform size throughout and are parallel with one another, the plate when once rolled can be easily pulled off from the table without being distorted or pressed out of shape. The ribs on the table act as guides or ways upon which the plate slides readily. If the ribs on the plate were not parallel and were not made in the manner described, the plate of glass would be forced out of shape in pulling it off from the table and the edges of the metal ribs on the table would be very liable to be broken. After the glass has been rolled in the manner described it is drawn off from the table onto a carrier of some suitable kind and is conveyed at once to the annealing-oven. After the glass has been properly annealed it can be cut into any shapes or forms that may be desired.

In operating this machine it will be found advisable to cool the table occasionally by dashing water upon it, for the reason that if the table is allowed to get too hot the glass is apt to stick to the metal, and if it becomes too cold the metal is apt to chill the glass.

Many advantages are secured by my invention. Large plates of prismatic glass or plates of any desired size can be manufactured quickly and at comparatively slight cost. Such plates can be made thin enough to be cut into panes of any desired shape and size. The prismatic ribs which are formed upon the surface of the glass are very complete and full and perfect in outline. The machine itself is simple and inexpensive in construction and can be very easily operated. The table, with its ribs or projections, can be made easily and economically by simply running the table through a planing-machine. If the edge of any one of the ribs becomes broken by reason of the glass being a little hard at that place, the machine can be repaired without difficulty by the use of a lathe or planer. By using strips 6 6 of different thicknesses the thickness of the finished plate of glass can be changed and regulated as desired.

In the form of machine shown and described the roller is made to move upon the table. It will be evident that the machine could easily be altered so as to make the table move underneath the roller.

My invention is not limited to the specific form of it shown in the drawings herein, as it may be varied in many ways without departing from my invention. For example, it is not essential that the ribs upon the table, which produce the prisms in the glass, should be of the same form in cross-section as those shown in the drawings as long as they are of such a form as to produce suitably-shaped prisms in the glass.

The invention shown and described in this application forms a species of my generic invention shown and claimed in another application filed by me simultaneously with the filing of this application and known as No. 681,011.

I do not herein claim the method of making panes or windows of prismatic glass, which is partly described in the above specification, as the said method is claimed in other applications filed by me on November 30, 1901—to wit, Serial Nos. 84,207 and 84,208—and I do not herein claim the improved prismatic window which my improved machine is especially adapted to be used in making, as the said product is claimed in separate applications filed by me on August 15, 1898—to wit, Serial Nos. 688,578 and 688,579.

What I claim as new, and desire to secure by Letters Patent, is—

1. In a machine for making plates of prismatic glass the combination of a revolving plain roller and a supporting-table provided with parallel ribs of a prismatic form corresponding to the depressions to be made in the glass, the said parts having a traversing motion relatively to each other.

2. In a machine for making plates of prismatic glass the combination of a revolving plain roller and a supporting-table provided with parallel ribs of a prismatic form corresponding to the depressions to be made in the glass, the said parts having a traversing motion relatively to each other, the ribs on the table running in a direction parallel to the direction of the traversing movement of the roller and table relatively to each other.

3. In a machine for making plates of prismatic glass the combination of a revolving plain roller and a supporting-table provided with parallel ribs triangular in cross-section, the said parts having a traversing motion relatively to each other.

4. In a machine for making plates of prismatic glass, the combination of a plain revolving roller and a supporting-table provided with continuous ribs parallel with the direction of motion of the movable part and triangular in cross-section and having a cutting edge at their outer angle extending in a direction toward said roller, one of the parts being movable upon the other, substantially as set forth.

5. In a machine for making plates of prismatic glass, the combination of a plain revolving roller and a supporting-table provided with continuous ribs parallel with the direction of motion of the movable part and triangular in cross-section and having a cutting edge at their outer angle extending in a direction toward said roller, the roller being movable on the table, substantially as set forth.

6. The combination of the roller 7, the gear-wheels 8, the table provided with the ribs 4 triangular in cross-section and having a cutting edge at their outer angle extending in a direction toward said roller, the racks 5, and the strips 6, substantially as set forth.

In testimony whereof I have signed my name to this specification in the presence of two subscribing witnesses.

GEORGE K. CUMMINGS.

Witnesses:
H. K. CUMMINGS,
JAS. C. HOWELL.